(No Model.) 2 Sheets—Sheet 1.

H. BILLETER, Jr.
AUTOMATIC LUBRICATOR.

No. 375,597. Patented Dec. 27, 1887.

Witnesses.

Inventor:
Heinrich Billeter Jr.
By James L. Norris
Atty.

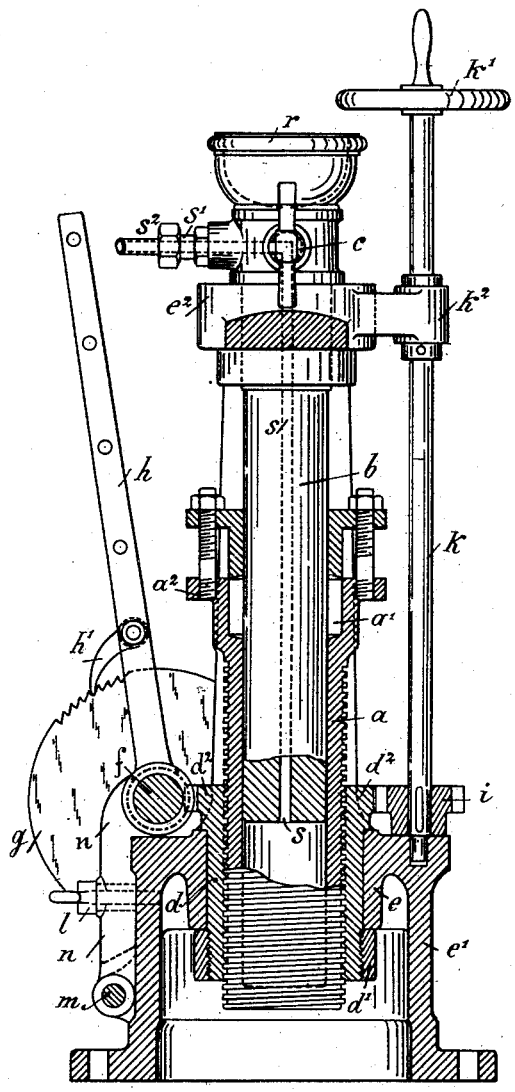

UNITED STATES PATENT OFFICE.

HEINRICH BILLETER, JR., OF ASCHERSLEBEN, PRUSSIA, GERMANY.

AUTOMATIC LUBRICATOR.

SPECIFICATION forming part of Letters Patent No. 375,597, dated December 27, 1887.

Application filed Ju'y 5, 1887. Serial No. 243,411. (No model.)

*To all whom it may concern:*

Be it known that I, HEINRICH BILLETER, Jr., residing at Aschersleben, Kingdom of Prussia, German Empire, have invented new and useful Improvements in Automatic Lubricators, of which the following is a specification, reference being had to the accompanying drawings.

The present invention relates to apparatus for automatically lubricating machinery, which apparatus is distinguished by its great simplicity of construction and certainty of action.

Figure 1:
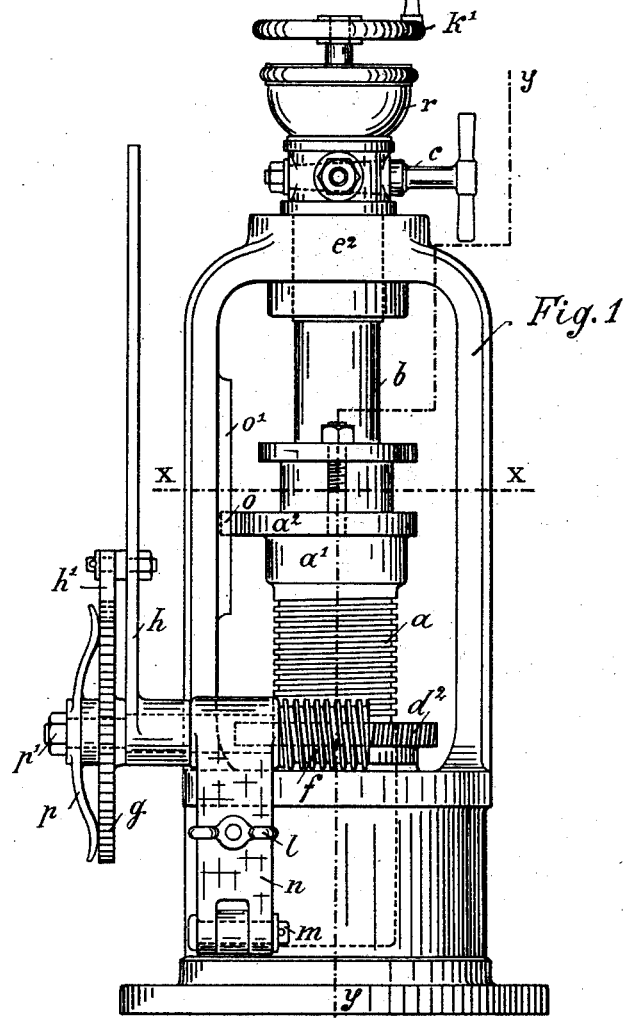
Figure 2:
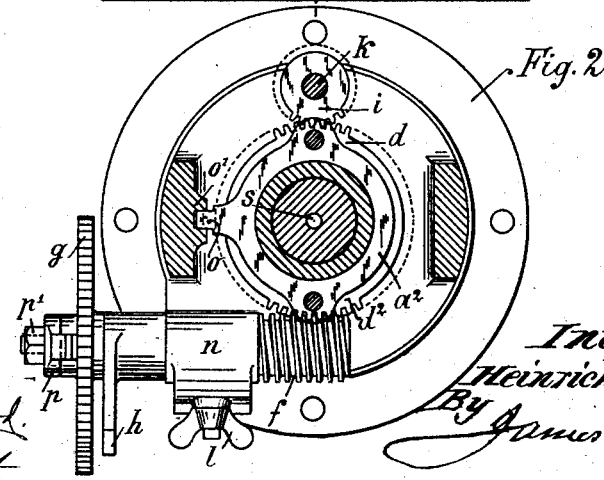

In the accompanying drawings, Figure 1 is a front elevation of apparatus constructed according to my invention. Fig. 2 is a section of the same, on the line $xx$, Fig. 1, and Fig. 3 is a side elevation, partly in section, on the line $yy$, Fig. 1.

This improved apparatus consists, essentially, of three principal parts, viz: The cylinder $a$, the driving piston or plunger $b$, and mechanism for displacing these two parts relatively to each other. The cylinder is provided with the stuffing-box $a'$, and is closed at the lower end. The flange $a^2$ of the stuffing-box has a projection, $o$, which moves in a groove, $o'$, formed in the frame of the apparatus. Instead of this projection and groove a longitudinal groove can be formed in the cylinder and a pin fixed to the frame caused to engage with this groove.

Upon the outside of the cylinder $a$, along its entire length, are formed screw-threads, with which a nut, $d$, made in the form of a sleeve, engages. This nut turns in the socket $e$ in the base $e'$ of the apparatus, and in order that no longitudinal displacement shall occur the sleeve is provided at its upper end with a shoulder and at its lower end with a nut, $d'$. The said sleeve is moreover provided at the upper edge with teeth $d^2$, with which the worm $f$ engages. The said worm is firmly connected with its shaft, which is journaled in a block, $n$, capable of swinging at its lower end upon a pivot, $m$, which is supported in lugs on the base $e'$. The said block $n$ is secured in position by the nut $l$ on a screw attached to the base. If the nut is removed, the block $n$ can be turned back so far that the worm $f$ is disengaged from the teeth $d^2$. Upon the shaft of the worm $f$, on one side of the block $n$, is a lever, $h$, which can reciprocate or swing back and forth upon the said shaft through the medium of any suitable device. A ratchet-wheel, $g$, is likewise loose upon the shaft, with the teeth of which ratchet-wheel $g$ the pawl $h'$ on the lever $h$ engages. A flat spring, $p$, is so fixed upon the shaft by means of a nut, $p'$, that it must turn with the shaft. The ends of the spring press upon one side of the ratchet-wheel $g$.

The piston $b$ of the apparatus is firmly connected at its upper end with the cross-beam $e^2$ of the frame, and is provided with an oil-cup, $r$, in the bottom of which a cock, $c$, is inserted. In the piston is formed a longitudinal hole, $s$, which extends through the cock $c$ and terminates in the oil-cup $r$. A lateral opening also extends from the cock $c$, to which opening the oil-exit pipe $s^2$ is connected.

A vertical shaft, $k$, is supported at its lower end in the base of the apparatus, and is held near the upper end by an arm, $k^2$. This shaft carries a hand-wheel, $k'$, and at the lower end is provided with a spur-wheel, $i$, which engages with the teeth $d^2$ of the sleeve $d$.

During every reciprocation of the lever $h$ the ratchet-wheel is turned through a definite angle, and thereby, also, through the medium of the frictional spring $p$, the shaft upon which is the worm $f$ is turned, provided that the resistance opposed to the rotation is not larger than the friction between the spring $p$ and the ratchet-wheel $g$. The rotation of the shaft $f$ causes the sleeve $d$ to turn, and this gradually moves the cylinder $a$ upward, whereby the oil in the cylinder is pressed through the bore $s$ of the plunger to the cock $c$, and through the small pipe $s^2$ to the part of the machine with which it is connected. When the cylinder has risen so high that the bottom of the same comes into contact with the piston, the cylinder must be returned to its lowest position and again filled with lubricating material. No breakage can occur when the cylinder-bottom comes into contact with the piston, as the spring then slides on the surface of the ratchet-wheel $g$, and therefore no longer turns the worm $f$.

For the purpose of filling oil into the cylinder the screw $l$ is removed and the worm $f$ is disengaged from the teeth $d^2$. The cylinder can then be moved more quickly downward by means of the hand-wheel $k'$ and the wheel $i$ than would be possible by turning the ratchet-wheel back.

When moving the cylinder downward, the cock $c$ is turned so that the pipe $s'$ is closed and the oil-cup $r$, into which the necessary oil is poured, is in connection with the interior of the cylinder.

What I claim is—

1. In lubricating apparatus, the combination of the piston $b$, provided with a longitudinal passage, the cylinder $a$, adapted to be moved on the said piston by means of a thread cut upon its outer periphery and a nut, $d$, the turning of the said cylinder being prevented by a longitudinal groove and a projection engaging with the said groove, a worm, $f$, acting upon the nut $d$, and the ratchet-wheel $g$, all for the purpose of pressing the lubricant through the said longitudinal passage in the piston, essentially as described and represented.

2. The combination, with the piston $b$, having a longitudinal passage, the non-rotating screw-threaded cylinder $a$, the nut $d$, the worm $f$, acting on the nut, and the ratchet-wheel $g$ on the shaft of the worm, of the flat spring $p$, firmly secured to the worm-shaft and sliding upon the ratchet-wheel when the resistance becomes too great, substantially as and for the purposes described.

In witness whereof I have signed the foregoing specification this 24th day of May, 1887.

HEINRICH BILLETER, JR.

Witnesses:
PAUL HERMS,
W. WENGHÖFER, Jun.